United States Patent [19]
Foote

[11] Patent Number: 5,503,350
[45] Date of Patent: Apr. 2, 1996

[54] MICROWAVE-POWERED AIRCRAFT

[75] Inventor: Howard A. Foote, Palm Springs, Calif.

[73] Assignee: Skysat Communications Network Corporation, New York, N.Y.

[21] Appl. No.: 145,204

[22] Filed: Oct. 28, 1993

[51] Int. Cl.⁶ .................................................. B64C 39/02
[52] U.S. Cl. ............................ 244/1 R; 244/13; 244/62; 244/190; 244/194
[58] Field of Search ............................. 244/1 R, 13, 36, 244/62, 189, 190, 194

[56] References Cited

U.S. PATENT DOCUMENTS

| | | | |
|---|---|---|---|
| D. 139,634 | 12/1944 | Walker | D12/333 |
| D. 145,145 | 7/1946 | Riegel | 244/13 X |
| 1,893,129 | 1/1933 | Charpentier | 244/36 X |
| 2,604,276 | 7/1952 | Huben | 244/62 X |
| 4,662,588 | 5/1987 | Henderson | 244/36 X |
| 4,943,811 | 7/1990 | Alden et al. . | |
| 4,955,562 | 9/1990 | Martin et al. | 244/62 |
| 5,068,669 | 11/1991 | Koert et al. . | |
| 5,082,204 | 1/1992 | Croston | 244/36 X |
| 5,218,374 | 6/1993 | Koert et al. . | |

FOREIGN PATENT DOCUMENTS 951902  11/1949  France ......................... 244/36

Primary Examiner—William Grant
Attorney, Agent, or Firm—Anderson Kill Olick & Oshinsky

[57] ABSTRACT

An unmanned, remotely controlled microwave-powered aircraft for use as a stationary communications platform. The aircraft is generally a flying wing with a large, flat inner wing having a rectenna on the underside. Rectennas may also be provided on the underside of the wings, the combined output from the rectenna being used to provide power to two electric motors housed within torpedo-shaped nacelles which drive two rear propellers. The rectenna converts a microwave signal at 35 GHz generated by a ground power station utilizing dual gyrotrons and a 34-meter diameter antenna dish. The aircraft has a preferred airfoil cross section throughout and is constructed of lightweight but strong materials in order to provide an enhanced flying time of several months. A power management and distribution system manages the DC power produced by the rectenna to supply power to the flight controls, propulsion system and payload.

10 Claims, 10 Drawing Sheets

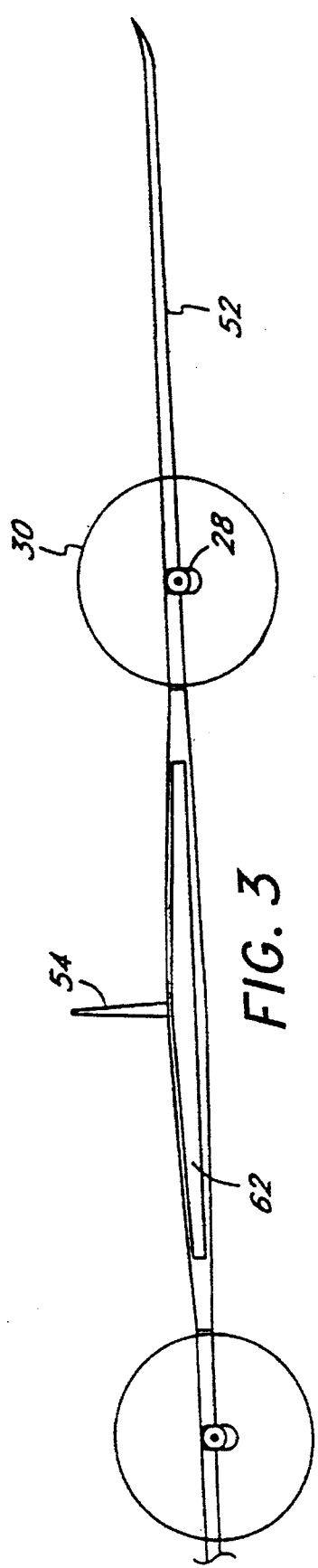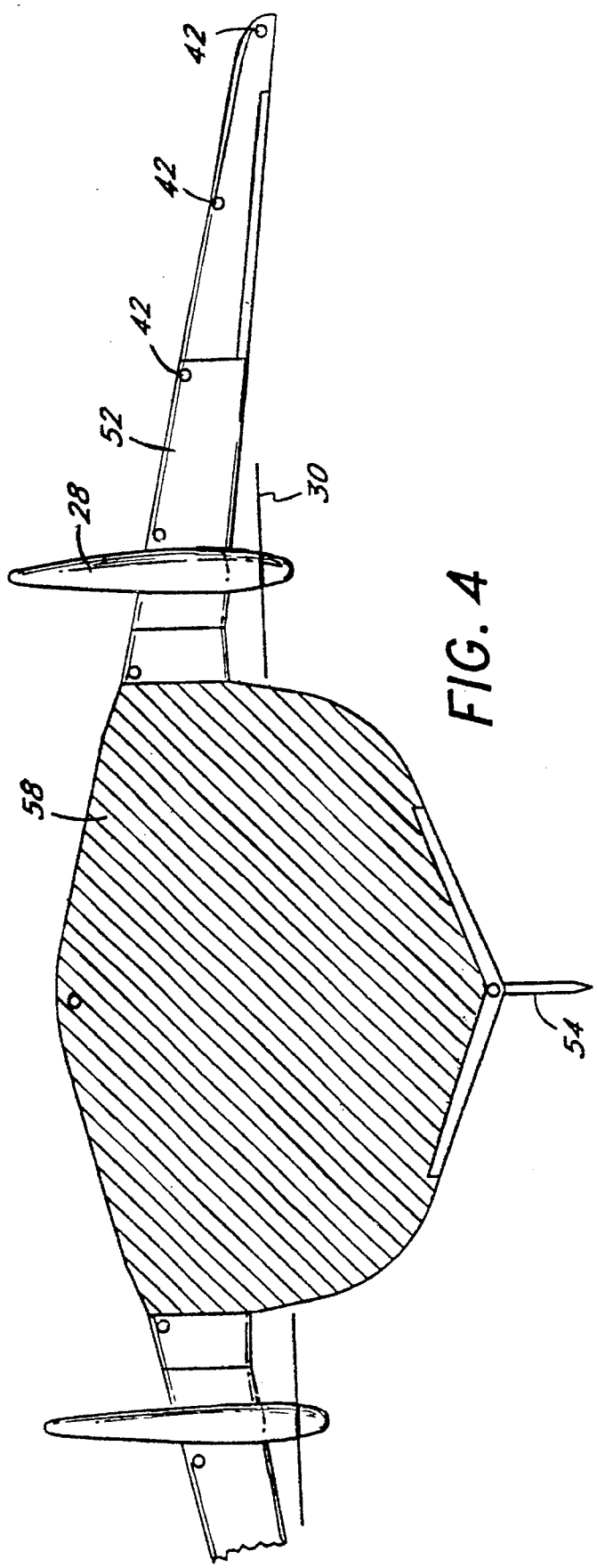

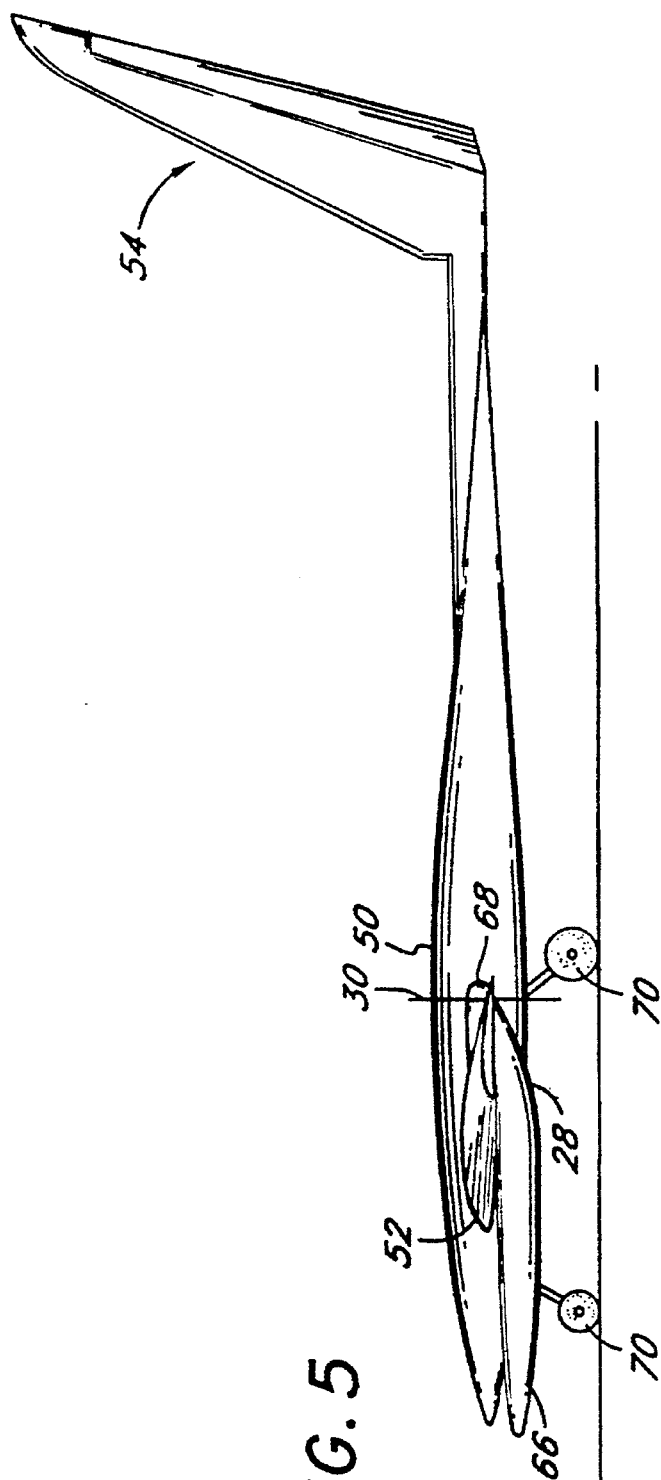
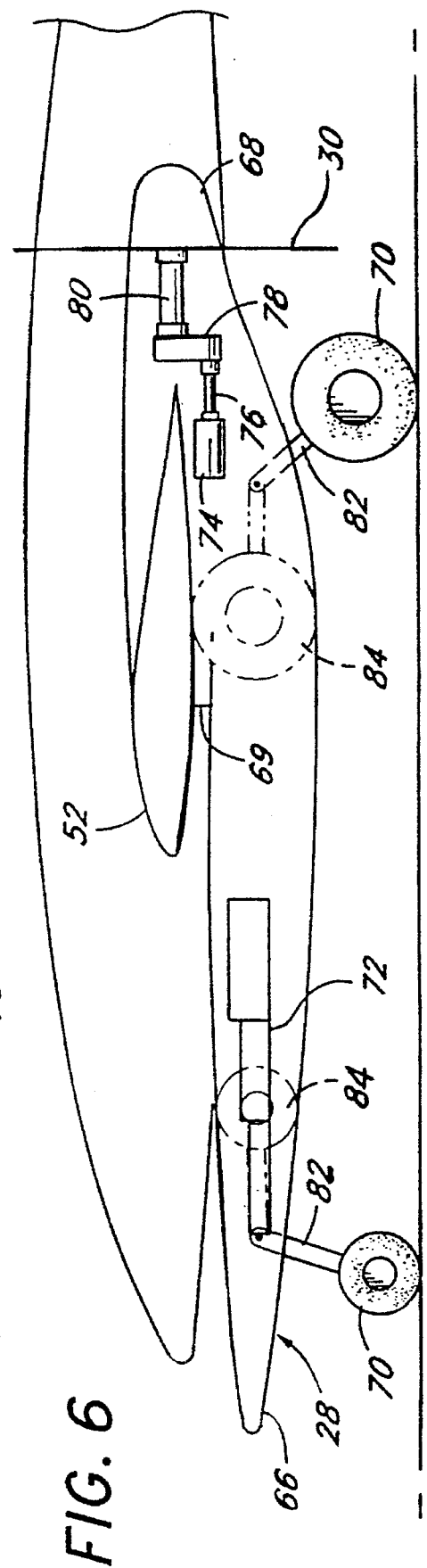
FIG.5
FIG.6

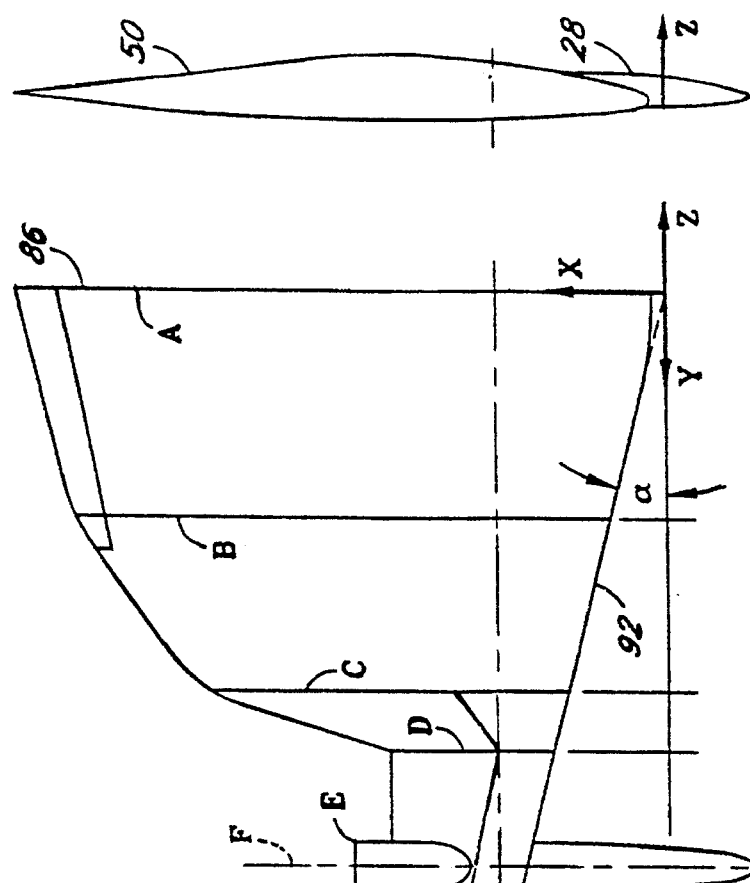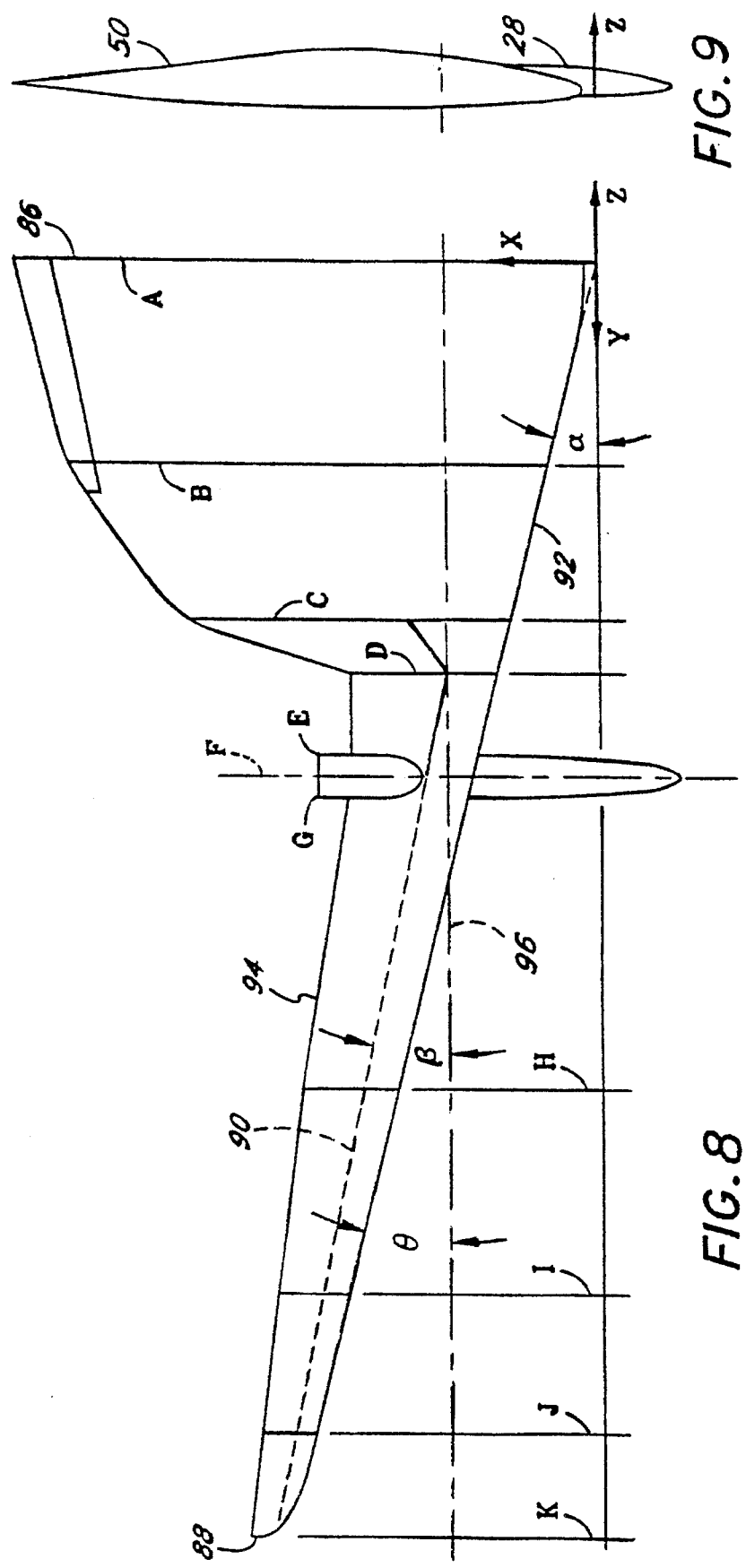

MICROWAVE-POWERED AIRCRAFT

FIELD OF THE INVENTION

The present invention relates to a microwave-powered aircraft and, more particularly, an unmanned, remotely controlled aircraft to which microwave power is transmitted from a ground station and converted to useful DC power by arrays of rectifying antennas mounted on the aircraft, the aircraft being capable of long-duration, high-altitude missions.

DESCRIPTION OF RELATED ART

Attempts have been made for many years to develop a system for transmitting energy to power a remote device with a high degree of efficiency (for a general discussion see "The History of Power Transmission by Radio Waves" by William C. Brown, *IEEE Transactions on Microwave Theory and Techniques*, Vol. MTT-32, No. 9, September 1984). In particular, the concept of powering an aircraft with terrestrially radiated electromagnetic energy has received a great deal of attention. The radiated electromagnetic energy incident on the aircraft is converted to direct current (DC) energy which powers the aircraft, allowing it to remain aloft for extended periods of time (e.g., about 6 months).

Previous authors have suggested that remotely powered aircraft be used as platforms for telecommunications, surveillance, and remote sensing. See U.S. Pat. No. 4,955,562 to Martin, et al.; see also U.S. Pat. No. 4,943,811 to Alden, et al. One author has specifically stated that remotely powered aircraft should be used as telecommunications relay platforms to retransmit television and mobile telephone signals within a metropolitan region. See Arthur Fisher, "Secret of Perpetual Flight? BEAM-POWERED PLANE," *Popular Science,* January 1988, p. 106. Despite suggesting differing techniques for remotely powering the aircraft, these references fail to sufficiently describe the payload system requirements and design. Furthermore, these references fail to disclose microwave powered aircraft systems which can be manufactured and deployed in a cost efficient and practical manner, and have also failed to adequately address the aerodynamic requirements of the aircraft utilized for microwave powered flight.

Conversion of the radiated electromagnetic energy to DC energy at the aircraft is well known in the prior art and typically is performed by a power collecting and conversion device known as a rectifying antenna or "rectenna". In systems of the prior art, the rectenna is typically mounted on the lower surface of the aircraft where it rectifies incident electromagnetic energy of the appropriate wavelength into DC energy. The DC energy is used to power the aircraft's propulsion system and on-board systems. The rectenna typically consists of an array of half wavelength dipole antennas, each terminated by a rectifying diode. The rectenna converts the maximum power density of incident electromagnetic power into DC electrical energy. By increasing the rectenna surface area exposed to incident electromagnetic radiation, the rectified DC energy may thereby also be increased. Therefore, to increase DC electrical energy output, rectenna surface area has often been increased in the prior art systems. However, increasing the size of the rectennas on remotely-powered aircraft introduces both aerodynamic and communications design problems. Due to the increased size of the rectennas, which are typically not designed to minimize aerodynamic drag, increased aerodynamic drag is introduced into the airflow passing over the aircraft during flight. The increased drag results in increased power required to keep the aircraft aloft, which, in turn, necessitates increased rectenna size.

Thus, it can be seen that there is a relationship between the electronic requirements for a microwave powered aircraft system and the aerodynamic requirements of the aircraft being powered. Unfortunately, in previous systems, the design focus has been on the electronic and electromagnetic aspect of such systems and not on the aerodynamic requirements of the aircraft.

In 1987, a scale model of a long-endurance, high-altitude aircraft, remotely powered by microwave energy, known as the SHARP (Stationary High Altitude Relay Platform) system, was successfully demonstrated. See Schlesak, et al., "A Microwave Powered High Altitude Platform," 1988 *IEEE MTT-S Digest.*, pp. 283–286. The SHARP concept employs an array of terrestrial antennas which are used to radiate microwave energy to a remote aircraft. Dual polarization rectennas, positioned underneath the aircraft, formed by two orthogonal linearly polarized rectennas, convert the terrestrially radiated microwave energy to DC energy which is used to power the aircraft.

The scale model SHARP aircraft, one-eighth the size of the actual aircraft, was flown for 20 minutes in 1987. The scale model aircraft was powered by energy generated by two 5 kilowatts continuous-wave magnetrons. The scale model aircraft used a ground station having one 4.5 meter diameter parabolic antenna which transmitted 10 kilowatts of the combined microwave energy generated by the magnetrons, at a frequency of 2.45 GHz. The small scale model aircraft had a wingspan of 4.5 meters, an overall length of 2.9 meters, weighed only 4.1 kilograms, and flew at a target altitude of only 150 meters. Due to the small size of the scale aircraft, only one parabolic antenna was needed to generate power which was sufficient to keep the aircraft aloft. However, the full scale 21 kilometer altitude microwave powered aircraft contemplated by the SHARP system has much more demanding power requirements, and as a result, disadvantageously demanding, complex, and expensive ground station antenna and aircraft rectenna requirements.

In addition, the scale model SHARP aircraft had mounted below the fuselage and just aft of the wings a large nonlifting disk on the lower surface of which the rectenna was mounted. At the small scale and low altitude for which this aircraft was designed, the configuration and structural mounting of the disk was not particularly critical to the overall performance of the system. However, at full scale and flown at normal altitude, the aerodynamic design of the SHARP aircraft would be inappropriate.

For example, the full scale SHARP aircraft, if constructed and flown at normal altitude, would require that the microwave energy be transmitted from a large array of parabolic antennas positioned on the ground in a circle having a diameter of approximately 85 meters. The SHARP microwave power transmission system would be comprised of a phased array of approximately 250 5-meter antennas, each antenna fed by a 5 kilowatt magnetron, each magnetron transmitting microwave energy at 2.45 GHz. The combined energy from the 250 antennas is focussed to a spot area having a half-power diameter of 30 meters. Using this configuration, approximately 500 kilowatts of microwave power is radiated to produce a power flux density of 500 watts per square meter at a 21 kilometer altitude. This requires that the aircraft have at least 100-m$^2$ of rectenna surface to generate only 35 kilowatts of DC power. This rectenna area requirement and the nonlifting configuration of the disk impose serious constraints upon the design of the aircraft, which, in turn, restrict the size and type of payload which the aircraft may carry.

A microwave-powered aircraft is also disclosed in U.S. Pat. No. 4,955,562, issued to Martin, et al. (hereinafter "Martin"). Martin teaches a microwave-powered aircraft which flies in a 4 km diameter circle above an array of microwave transmission antennas. The array of transmission antennas are located at ground level within a circular area of approximately 70 meters in diameter. The array of transmission antennas cooperate to transmit a power beam in an upwardly direction toward the aircraft, focussing the power spot on the aircraft's rectenna. At the desired 20 km altitude, the focussed power spot is approximately 30 meters in diameter. The disadvantages introduced by the requirement of having an array of transmission antennas was discussed above with reference to the SHARP system. In addition, the Martin aircraft is flawed because it does not tightly focus the power beam to a desirable diameter. Unless the aircraft rectenna is designed to accommodate 30 meters of power beam transmission, energy will be wasted. Unfortunately, the use of a rectenna having a 30 meter diameter introduces substantial aerodynamic drag problems associated with the design of the aircraft. Moreover, Martin teaches the use of a lenticular body which is configured in order to avoid the generation of lift, and any associated lift-induced drag. However, the shape of such body is such that skin drag will be substantial, not to mention the structural difficulties associated with mounting such a body on the fuselage of a standard aircraft.

Efforts at remotely-powering an aircraft to date, like the SHARP system, have focused primarily on using the so-called S-band transmission sources due to their ready availability and to reduce power losses due to atmospheric attenuation. S-band power transmission, as demonstrated by the SHARP system, is limited in the amount of power that can be delivered in a practical system. As a result, a large number of ground transmission antennas are needed. The number of antennas used by an S-band transmission system could be reduced, however, the size of each antenna would increase significantly thereby increasing the cost of the ground station while also increasing the difficulty of tracking the airborne aircraft. In addition, as demonstrated by the SHARP system discussed above, S-band power beaming disadvantageously requires a large amount of rectenna surface area on the aircraft to generate sufficient power to propel the aircraft.

In order to reduce the rectenna size requirements and the number of terrestrial power transmission antennas, yet provide the aircraft with sufficient propulsion and payload power, higher frequency electromagnetic energy has been disclosed in the prior art. For example, U.S. Pat. No. 5,068,669, given to Koert, et al. (hereinafter "Koert") teaches a power beaming system using high frequency source transmissions operating at a frequency of at least 10 GHz. Koert discloses the use of gyrotrons to produce the millimeter-wave electromagnetic energy for transmission to a remotely powered aircraft. However, Koert does not adequately describe the configuration or structural requirements of the aircraft to be utilized in connection with such a microwave system.

Accordingly, a need exists for a microwave powered aircraft which is aerodynamically designed to function efficiently in a wide variety of microwave systems.

SUMMARY OF THE INVENTION

In accordance with the inventive concepts of the present invention, a remotely-powered aircraft is provided which has extremely high flight efficiencies and thus low-power requirements. The aircraft is essentially a flying wing-shaped body having a broad inner wing and two outwardly extending lift-generating outer wings. There is no fuselage, per se, as the inner wing includes a blunt, slightly V-shaped leading edge having an apex which diverges on either side into general alignment with the leading edges of the outer wings. The inner wing has a relatively low aspect ratio (span to chord), and the outer wings have relatively high aspect ratios. However, while relatively low compared to the outer wings, the aspect ratio of the broad inner wing is much improved over typical fuselages. The overall aspect ratio of the aircraft of the present invention is approximately 36:1 for high efficiency flight.

An upstanding rudder is provided at the centerline of the broad inner wing proximate the tail. A pair of electric motors are mounted on each outer wing which drive propellers for propulsion. The motors and propellers are mounted within torpedo-shaped nacelles mounted underneath the outer wings at a location outwardly spaced from the inner wing. An array of signal receiving and rectifying elements for collecting a remote signal and converting it to DC power (the "rectenna") is mounted and conforms to the under surface of the inner wing. The DC power is conditioned and routed to the propulsion motors and also to a payload system on board. The payload may include, for example, infra-red cameras, communications antennas, atmospheric sampling equipment, etc.

In one aspect of the present invention, the rectenna is mounted on the underside of the inner wing for receiving a power beam transmitted from a ground station. Contrary to prior designs, the rectenna is incorporated into a lift-generating body of the aircraft rather than on a separate body, thus limiting drag to that unavoidably induced by the lift-generating wing. The broad inner wing on which the rectenna is mounted is designed to produce a laminar flow of air across its surfaces in order to further reduce drag. The use of a lift-generating inner wing for mounting the rectenna, and the aerodynamically efficient positioning of this inner wing between the two outer wings, provides a much improved aircraft design which allows more power and payload weight to be devoted to the communications payload.

In accordance with another advantage of the present invention, the remotely powered aircraft receives a microwave signal beam generated by a ground station incorporating one or more gyrotrons which together produce an output of approximately 400 kW at a frequency of 35 GHz. The outputs of the gyrotrons are combined and channeled through a mode converter prior to being fed through a wave guide and transmitted from a 34-meter diameter antenna dish.

The beam of microwave power propagates upward in a main lobe of energy and a plurality of side lobes. The present invention utilizes a precise waveguide to produce an extremely narrow main lobe in the near field at 70,000 feet, the anticipated cruise altitude of the aircraft. By controlling the region of maximum power density at the cruise altitude, the rectenna can be optimally sized slightly larger than the beam in order to collect the maximum amount of transmitted energy without extraneous rectenna area and corresponding aircraft surface area. Thus, the present aircraft is essentially designed to best utilize a highly efficient and narrow microwave power beam.

In an optimization of the beam-to-aircraft interface, the preferred transmitting antenna on the ground includes a variable height sub-reflector which allows the location of the maximum beam strength to be varied in order to alter the altitude of the focussed main lobe and power the aircraft during its climb to altitude. The microwave beam is desirably tightly focused to provide a coverage area of approximately 8 meters at a cruise altitude of 70,000 feet to be fully received by a 10 meter diameter rectenna on the underside of the aircraft. The beam propagates in a substantially vertical path which further maximizes the efficiency of the received power and reduces tracking problems.

A tracking signal from the aircraft back down to the beaming antenna provides feedback to the ground control for focussing the antenna dish at the exact center of the rectenna. The ground control may transmit data from the primary tracking signal to a secondary communications antenna to facilitate the initial precise acquisition of the aircraft which previously involved a search and locate procedure. Further, as a redundancy, after acquisition, any secondary ground communications antenna may also track the aircraft and relay the position information to the ground station in the event the direct tracking signal is inoperative. In another tracking scenario, the power outputs from the individual rectifying panels may be monitored in order to locate the position of the exact center of the power beam on the array, which is the point of highest energy density. The power distribution then may be used to adjust the power beaming antenna to extremely accurately focus on the direct center of the array.

The power is received by the rectenna and then converted into usable DC power. Preferably, at cruise altitude, the efficiency of the entire system produces a DC power of approximately 150 kW, 10 kW of which are used to power the on-board payload system, and the rest for propulsion. Each motor may be supplied with a maximum of 75 kW of power which is ample for climb and maintenance of altitude of the present aircraft. However, preferably, the motors require a power input of approximately 54 kW during maximum climb.

The aircraft of the present invention includes an improved aerodynamic shape from wingtip to wingtip to reduce the formation of vortices and associated drag. The outer wings have gradually reducing thickness ratios (thickness-to-chord-length) from the location proximate the inner wing outward. In addition, the nacelles carrying the propulsion system depend from underneath the outer wings so as not to interfere with the flow around said wing portions. Perhaps most critically, the region connecting the broad inner wing with the outer wings is designed to ensure a smooth laminar flow around the aircraft and eliminate vortices. Preferably, the inner wing has a larger thickness than the outer wings and a substantially horizontal angle of attack, whereas the outer wings form a 3° angle of attack with the horizontal. A narrow transition section within this connecting region at the outer peripheral edge of the inner wing also has a 3° angle of attack to match the outer wings, thus providing a smooth transition between flow regimes across the inner and outward wings.

The preferred aircraft of the present invention is constructed substantially of composite materials with a central transverse solid spar stemming from the inner wing outward to the tips of the wing portions. The cross-sectional air foil shape of the outer wings are defined by a hollow outer shell of composite materials bolstered by the central spar. Likewise, the inner wing is constructed of an outer composite shell reinforced by intermittent longitudinal and transverse spars. Consequently, the reduced weight of the structural components of the aircraft, in conjunction with the improved flight efficiency, allows the aircraft to support a payload of approximately 30–40% of the entire aircraft weight. In one embodiment, the payload may weigh 770 lbs., while the entire aircraft weighs approximately 3,000 lbs., or 1.5 tons. In a preferred embodiment, the aircraft has a span of approximately 120 feet (37 meters) and a length of approximately 38 feet (11.6 meters). The inner wing preferably has a surface area of approximately 890 square feet (83 m$^2$) with an array of rectenna elements mounted on the underside in an generally circular pattern having a diameter of approximately 38 feet (10 meters).

The aircraft of the present invention incorporates an improved power management and distribution system. A plurality of DC power busses divide the DC power and supply it to one or more flight control systems. The separate flight control systems may include power conditioning equipment and power storage batteries. Preferably, three flight control systems are provided, each one being connected to the flight control actuators to provide redundancy. Substantially all of the flight control actuators are connected to two or more power busses for redundancy with the notable exception of the left and right propellers which have a single power bus each dedicated to their operation.

An improved flight management system is incorporated into the unmanned aircraft of the present invention. The flight management system makes use of Inertial Measurement Units (IMUs) on the aircraft for determining attitude, heading, rate and acceleration needed by the flight control system. Furthermore, a differential global positioning system and a radar altimeter provide the precision approach information needed for auto-land capabilities. In one embodiment, the aircraft incorporates a plurality of small laser range-finders mounted across the flight surfaces to enhance control of the landing operation during the final approach when radar loses efficiency.

Due to the extended flight duration, a redundancy management system is incorporated to continuously monitor the system status for faults. The fault indication is tested to determine whether there is a valid fault detected, or simply a false alarm. The on-board computer is adapted to incorporate high-energy field protection which is critical to proper operation of the electronics equipment.

The unmanned aircraft of the present invention incorporates variable blade angle propellers which can be optimized for efficient climb and cruise. Specifically, the blade angle of the propellers is reduced at lower altitudes where the air is denser and the speed of the motors decreases. As the aircraft climbs, the motor speed increases. The propeller blade angle is also increased to provide a sufficient thrust component while minimizing the electrical power consumption. Preferably, the aircraft power management and distribution system devotes the entire DC power output from the rectenna to the motors during climb, and, thereafter, provides a portion of the power output to the payload system.

BRIEF DESCRIPTION OF THE DRAWINGS

FIG. 3 is a partial front elevational view of the unmanned aircraft;

FIG. 4 is a bottom plan view of the unmanned aircraft of FIG. 1 showing the rectenna and payload areas;

FIG. 5 is a side-elevational view of the unmanned aircraft;

FIG. 6 is a close-up view of the aircraft as shown in FIG. 5, illustrating the internal contents of the nacelle;

FIG. 7 is a front elevational view of one-half of the unmanned aircraft;

FIG. 8 is a top plan view of one-half of the unmanned aircraft showing the division of the inner and outer wings into discrete chordal regions;

FIG. 9 is a cross-section through the centerline of the unmanned aircraft;

DESCRIPTION OF PREFERRED EMBODIMENTS

Figure 1:
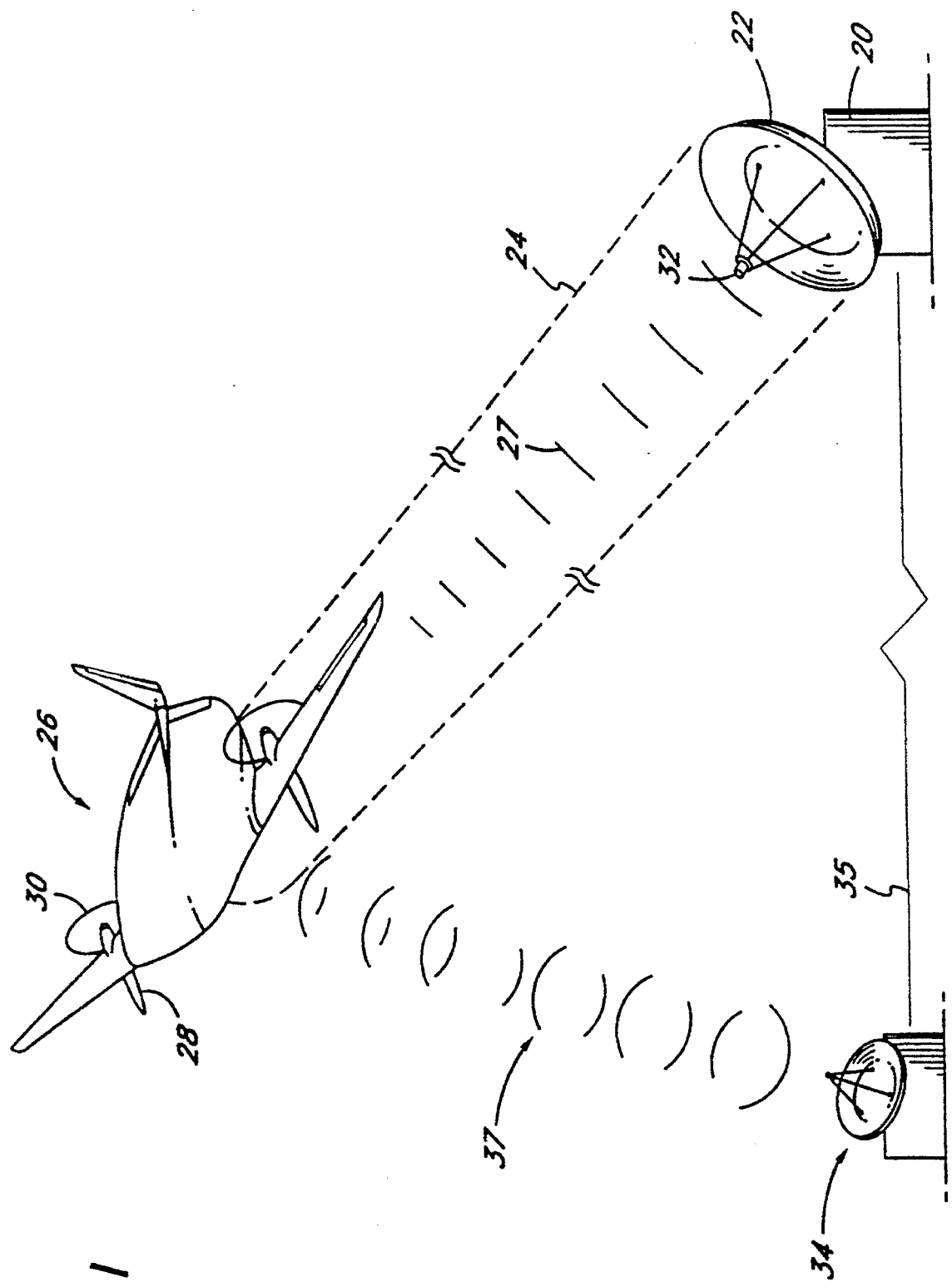
FIG. 1 is a schematic view of an unmanned microwave powered aircraft system of the present invention, illustrating the ascent of the aircraft to altitude and the use of a tracking system to ensure efficient microwave beam transmission and reception by the aircraft.
Figure 1A:
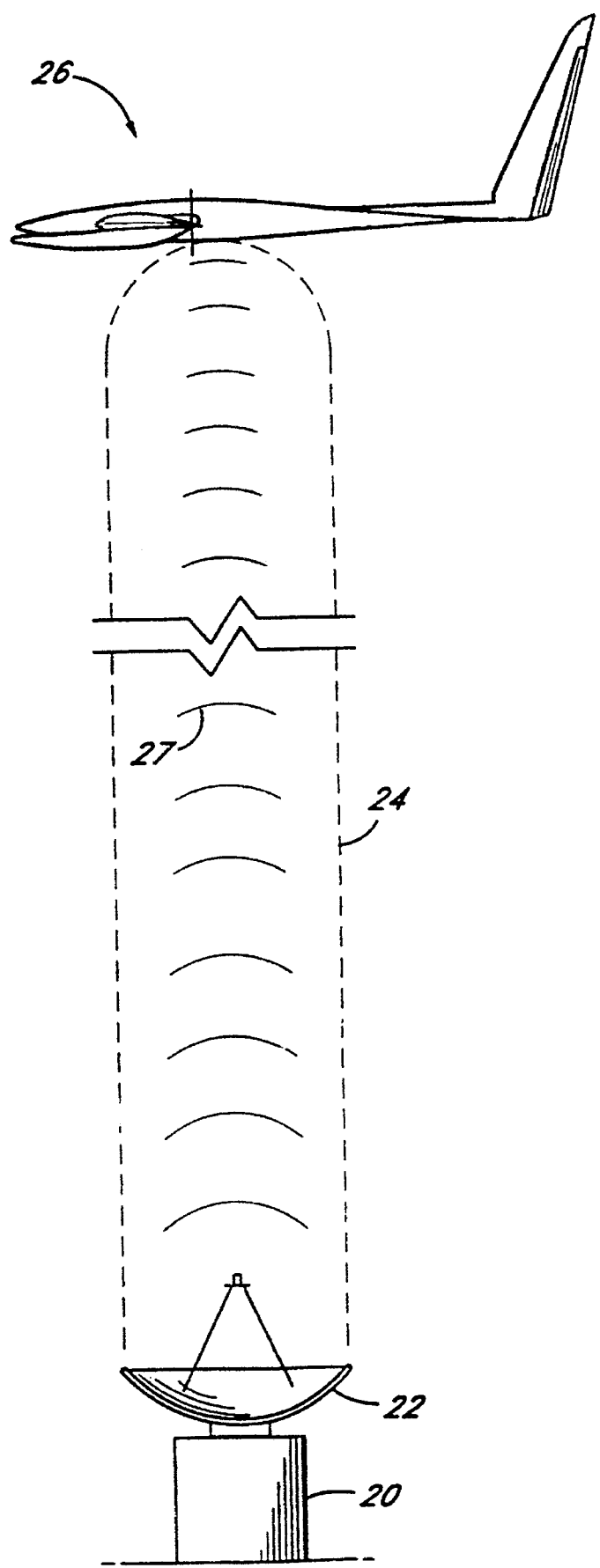
FIG. 1a is a schematic view of a main lobe of a preferred microwave beam focused on the aircraft of FIG. 1, illustrating the aircraft at altitude receiving an essentially vertical beam.

Referring now to FIG. 1, an unmanned microwave-powered aircraft system of the present invention is shown. The system in general comprises a ground control center 20 associated with a microwave transmission antenna 22 for transmitting upwardly a power beam indicated by lobe outline 24 to an aircraft 26, which is to be powered by the microwaves. The aircraft 26 is propelled by one or more electric motors housed in a pair of torpedo-shaped nacelles 28 driving propellers 30, as will be more fully described below. The aircraft 26 is shown flying, for example, during its ascent to a cruise altitude of 70,000 feet above ground level. FIG. 1a illustrates the microwave beam 24 oriented substantially vertically in order to track the aircraft 26 once it reaches cruise altitude.

The antenna 22 directs and focuses a high-powered microwave beam onto the aircraft 26, which is converted into DC power by a rectenna 58 (best shown in FIG. 4) on the underside of the aircraft. A return tracking signal 27 from the aircraft 26 back down to the beaming antenna 22 provides feedback to the ground control center 20 to aim and focus the beaming antenna in an optimum manner on the aircraft, typically the exact center of the rectenna 58.

In an optimization of the beam-to-aircraft interface, the preferred transmitting antenna 22 on the ground includes a variable height sub-reflector 32 which allows the location of the maximum beam strength to be varied in order to alter the altitude of the focussed main lobe 24 and power the aircraft 26 during its climb to altitude. The sub-reflector 32 may be varied several inches to change the altitude of the focused main lobe 24 of the transmitted beam in order to track the aircraft 26 upward. Preferably, the aircraft 26 is towed to a height of approximately 15,000 feet and released within the microwave beam 24 to be thereafter remotely powered up to a height of 70,000 feet, which is the preferred cruise altitude. The aircraft 26 typically flies in a figure-8 pattern of approximately 2 kilometers in length directly above the ground station. Thus, the transmitted beam 24 strikes the underside of the aircraft 26 in a substantially vertical path, as shown in FIG. 1a, which further maximizes the efficiency of the received power and reduces tracking problems.

Referring again to FIG. 1, a secondary tracking antenna 34 may be utilized as a redundant system to track the position of the aircraft and relay tracking signals to the ground control center 20 in order to accurately locate and transmit microwave energy to the aircraft. In this respect, the ground control 20 may transmit data from the primary tracking signal to the secondary communications antenna 34 via signal path 35. Providing the position data in this manner will speed up the initial precise acquisition of the aircraft by the secondary antenna 34 which previously involved a search and locate procedure. Further, after acquisition, the secondary ground communications antenna 34 may also track the aircraft 26 via signals 37 and relay the position information to the ground control 20 as a redundancy in the event the direct tracking signal 27 is discontinued.

As more accurately depicted in FIG. 1a, the aircraft 26 will "loiter" above the ground control center 20 in a generally figure 8 pattern having a length of approximately 2 kilometers. Due to the high altitude flight level and the relatively small area of flight, the angle at which the antenna 22 must move in order to track the aircraft is extremely low, on the order of 6° or less. Thus, the antenna dish 22 may be quite large and is preferably 34 meters in diameter. The large diameter antenna 22 thus allows the microwave beam 24 to be tightly focused on the aircraft which is in the near field of such an antenna throughout its flight. As will be apparent from the following description, the highly efficient flight dynamics of the present aircraft 22 allow a large percentage of the weight of the aircraft to be dedicated to a payload, or communication system. In addition, the low power requirements of the aircraft allow the use of a single antenna 22 and reduces the power input needed to generate the microwave beam 24. Finally, the aircraft 26 of the present invention includes a number of redundant systems on board to allow for flights of up to three or four months, and possibly more, dependent on the particular mission.

Unmanned Aircraft

Figure 2:
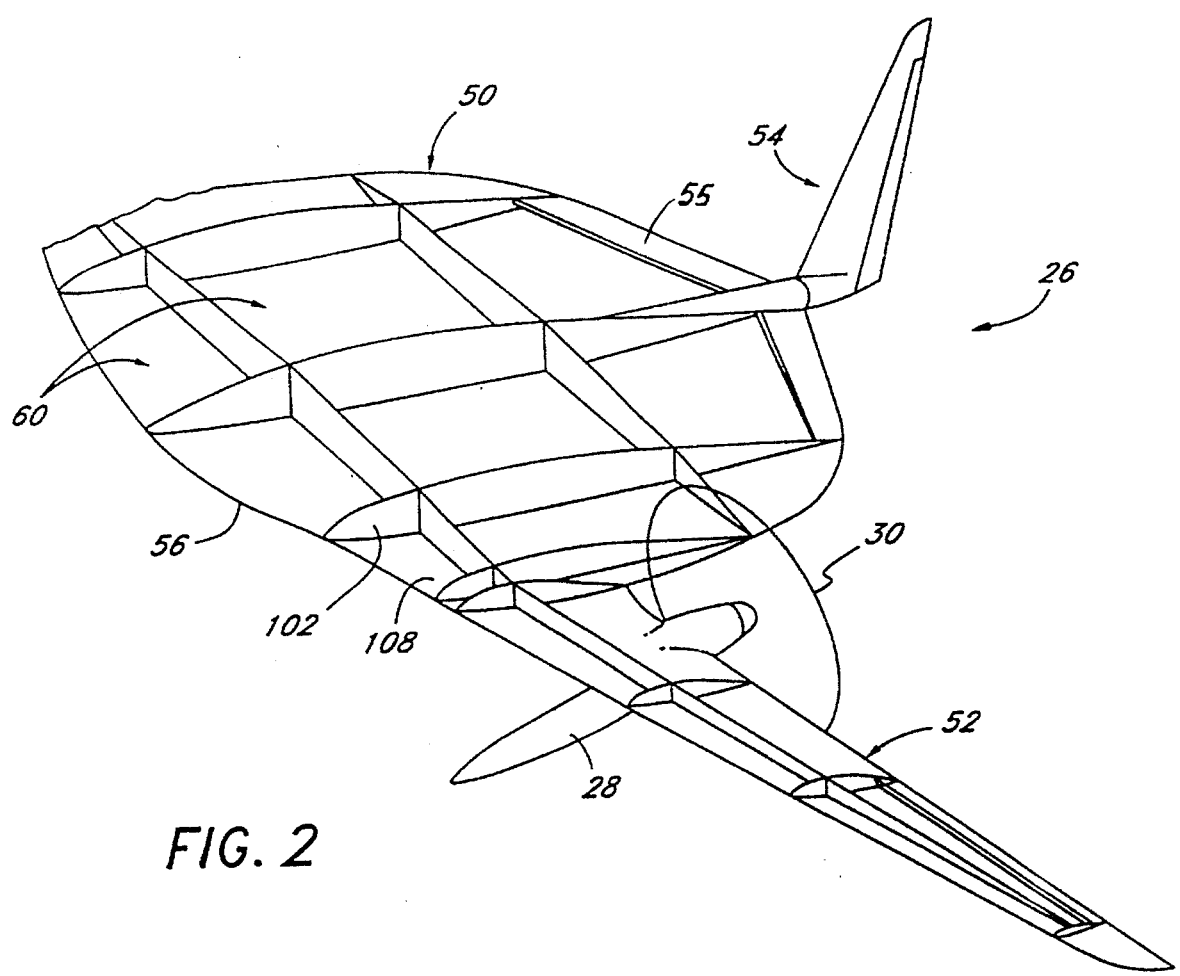
FIG. 2 is a partial perspective view of the unmanned microwave powered aircraft of the present invention showing inner and outer wing volumes.

Referring now to FIG. 2 of the drawings, the aircraft 26 has a broad central portion or inner wing 50, a pair of outer portions or wings 52 and a tail assembly indicated generally by reference numeral 54. The unconventionally shaped airframe is basically a flying wing with the front edge 56 of the wide inner wing 50 forming a leading edge which is generally co-linear with the leading edges of the outwardly diverging wings 52. Elevators 55 are shown on the trailing edge of the inner wing 50 but ailerons and flaps on the outer wing 52 trailing edges are not depicted. As will be explained later with respect to FIGS. 8 and 10, the aircraft 26 has a completely aerodynamic shape due to the fact that almost every portion (except the tail 54), including the inner wing 50, has an airfoil cross-sectional shape.

The aircraft is configured with a very high aspect ratio to have extremely high efficiency flight dynamics with correspondingly low drag in order to minimize the amount of power required to keep the aircraft aloft. Preferably, the overall aspect ratio of the aircraft 26 is between 20–36, and most preferably is 36. Of course, the overall aspect ratio does not reflect the aspect ratio at specific points on the aircraft. In particular, the outer wings 52 have extremely high aspect ratios and produce substantially all of the lift for the aircraft, while the inner wing 50 has a relatively low aspect ratio which, while still producing some lift, does not add a large amount of lift-induced drag or skin drag. Another measure of aircraft efficiency is glide ratio (lift to drag). In the present invention, the overall glide ratio is between 20–60, and preferably the glide ratio is 40. The low power required to maintain the aircraft in flight thus greatly reduces the amount of power beamed from the ground, as the majority of the power received by the aircraft is used by the propulsion system.

Although the aircraft is not directly polluting the atmosphere, the increased efficiency of flight reduces the amount of power needed, which indirectly reduces the amount of pollution produced by the original source of power generation.

FIG. 2 also illustrates the inner structure of the aircraft 26 of the present invention as though the upper outer skin layer had been removed. This view illustrates the inner structural supports which provide various compartments or volumes 60 shown in FIG. 2. Typically, the payload comprises a communication system having antennas 62 mounted on the forward and rear surfaces of the inner and outer wings, as shown in FIG. 3.

Rectenna

Figure 4A:
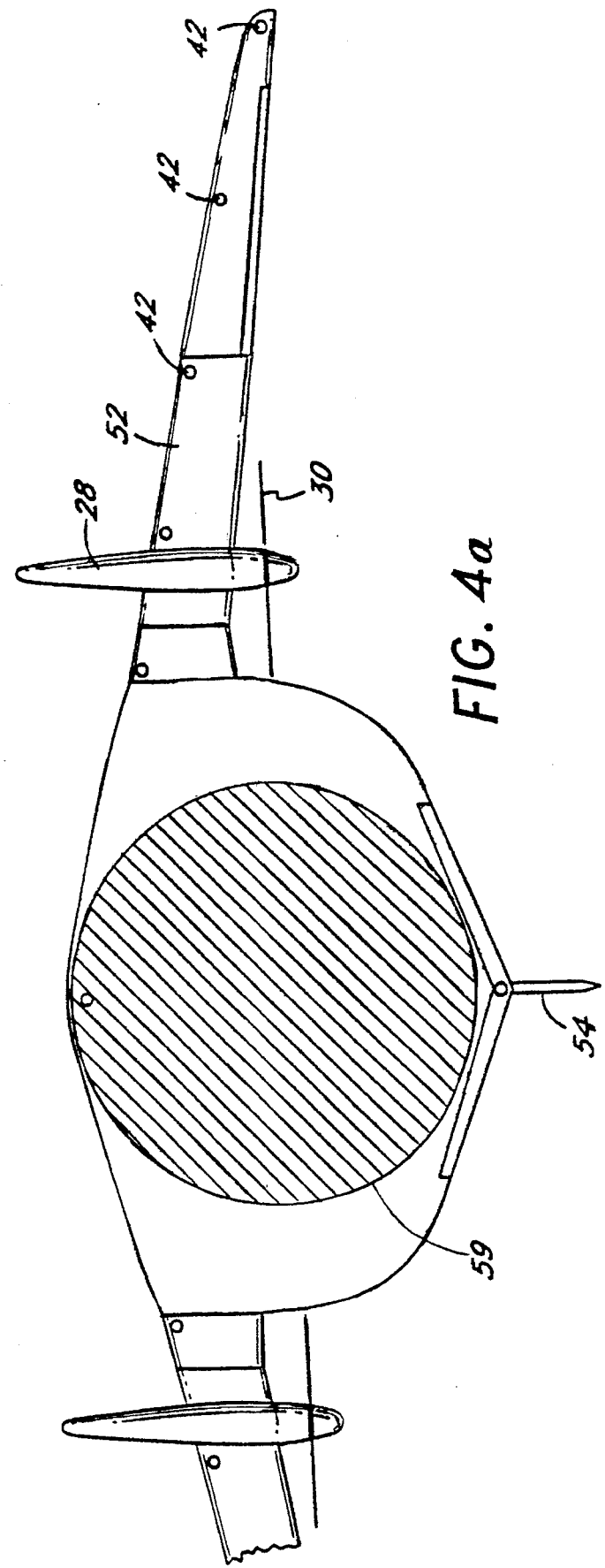
FIG. 4a is a view similar to that of FIG. 4 but showing a rectenna having a different surface area.

As seen in FIG. 4, a large portion of the underside of the aircraft is covered with an array of power receiving and rectifying panels which together comprise an antenna or rectenna 58. The rectenna 58 (cross-hatched in FIG. 4) represents the maximum coverage of the inner wing 50 on which the rectenna may be mounted. The preferred arrangement for mounting the rectenna is a generally circular pattern, as shown by dashed line 59 (FIG. 4a), comprising a multitude or array of small rectenna elements. The circular pattern 59 matches the circular cross section of the microwave beam so as to maximize the amount of energy collected. The maximum coverage however would basically be the complete bottom side of the inner wing.

The rectenna of the present invention may be substantially similar to the rectenna shown in U.S. Pat. No. 5,068,669 to Koert and others, which is incorporated by reference herein. This preferred type of rectenna includes layers of etched circuits which maximizes the outer surface area on which the collecting panels are disposed. In the center portion of the inner wing 50, there is preferably a 10-meter diameter circular array of square rectifying panels. In one embodiment, there are 2,000 20 cm×20 cm square panels on the underside of the inner wing 50. Alternatively, although not shown explicitly, there may be arrays of panels lining a majority of the underside of the wings 52 as well.

The rectenna 58, or subsections of rectifying panels, are preferably affixed to a recess in the surface of the underside of the aircraft 26 in order to present a flush aerodynamic surface. The recess is on the order of between 5 and 15 mm deep depending on the thickness of the rectenna 58, but is desirably 8 mm deep in the preferred embodiment. Due to the advanced Kevlar or graphite composite airframe construction, the recess is easily molded therein during manufacture. The rectenna 58 is affixed into the recess by conventional aircraft quality plate fasteners.

In an advantageous and heretofore undisclosed method of tracking an aircraft by an antenna, the power outputs from the individual rectifying panels may be monitored in order to locate the position of the exact center of the power beam, which is the point of highest energy density, on the preferably circular array 59. The power distribution then may be used to adjust the power beaming antenna 22 to extremely accurately focus on the direct center of the array 59. Referring to a schematic representation of FIG. 11, a number of sensors 36 mounted on or within a rectenna 124 may each be associated with a rectifying panel 125 (shown in an alternative configuration with an oval shape). The sensors 36 may report the power level incident on each panel 125 to a processing unit 40 which in turn relays the information to the ground control 20 via the tracking beam 27 (FIG. 1) represented by the small arrow 122 in FIG. 11. Alternatively, the sensors 36 may be autonomous from the power converting rectifying panels 125 but interspersed therebetween in order to similarly sense the power distribution of the incoming beam to allow the ground control 20 to adjust and center the beam accordingly.

Aircraft Missions

The unmanned aircraft 26 of the present invention is designed for highly efficient flight in order to stay aloft for periods of months and possibly years before requiring landing and servicing. The aircraft 26 may thus be recovered and re-launched at an extremely low cost, as opposed to conventional satellites. One advantage is that the payload does not have to be an extremely costly unit, as the cost of placing cargo on board the aircraft is substantially reduced. Thus, for example, possible payloads include simple cargo, high resolution cameras, infrared scanners, radar equipment, parachutes containing search and rescue containers, chemical sampling units, and other equipment. Some of the missions of which the aircraft is capable include a communications link, atmospheric studies, geophysical surveys, pollution monitoring, aerial video recording, Coast Guard patrol, search and rescue (SAR), forest fire prevention, anti-submarine warfare, drug enforcement, missile detection, etc. The options are essentially limitless as the cost of putting cargo on board the aircraft and placing the aircraft aloft is dramatically reduced compared to conventional satellites.

The various missions of the aircraft 26 of the present invention are more fully described in copending application Ser. No. 08/144,681, filed Oct. 28, 1993, entitled "Long-Duration Remotely Powered Airborne Communication System", herein incorporated by reference.

Aircraft Configurations and Parameters

In order to provide a better understanding of the configuration of the aircraft, as best seen in FIGS. 5–8, some typical dimensions are given here; although other dimensions and shapes are within the scope of the present invention. The span from wingtip to wingtip is approximately 121 feet (37 meters). The length of the aircraft from forward nose leading edge to the tip of the tail is approximately 38 feet (11.6 meters). The height of the aircraft is approximately 13 feet (3.9 meters). The aircraft is preferably powered by two four-bladed propellers having a diameter of 9 feet (2.7 meters).

In one embodiment, the gross weight of the aircraft, including a payload, is approximately 3,108 lbs. (1,410 kilograms). The aircraft has a payload capacity of 772 lbs. (350 kilograms).

As with all aircraft, the present unmanned aircraft has optimum flying conditions and performs differently at different altitudes. At the preferred cruise altitude of 70,000 feet, the preferred cruise speed is approximately 163 knots (84 meters per second), or a Mach number of 0.284. Approximately 35 kilowatts of total power for the engines is required to maintain the aircraft at the preferred cruise speed at the preferred altitude.

Table 1 shows a number of performance parameters at different altitudes for which the aircraft of the present invention has been designed.

TABLE 1

| Mode of Operation | Altitude (feet) | Density Ratio | Shaft Power (kW) | Prop. Rotational Speed (rpm) | Blade Angle (degrees) | Flight Speed (m/s) | Climb Rate (m/s) |
|---|---|---|---|---|---|---|---|
| CLIMB 2 MOTORS | 3,630 | 15.4 | 40.9 | 926 | 12.5 | 21.4 | 1.4 |
| " | 14,510 | 10.9 | 46.0 | 1080 | 12.5 | 25.4 | 1.6 |
| " | 23,690 | 8.1 | 46.0 | 1080 | 15.0 | 29.5 | 1.8 |
| " | 43,886 | 3.5 | 51.1 | 1543 | 15.0 | 44.8 | 1.7 |
| " | 54,790 | 2.1 | 51.1 | 1543 | 20.0 | 57.6 | 1.6 |
| " | 62,338 | 1.5 | 51.1 | 1543 | 25.0 | 69.3 | 1.3 |
| " | 70,000 | 1.0 | 51.1 | 1543 | 30.0 | 84.0 | 1.0 |
| CRUISE 2 MOTORS | 70,000 | 1.0 | 35.0 | 1447 | 30.0 | 84.0 | 0.0 |
| CRUISE 1 MOTOR | 70,000 | 1.0 | 37.8 | 1676 | 30.0 | 84.0 | 0.0 |
| MAX SPEED 2 MOTORS | 70,000 | 1.0 | 51.1 | 1447 | 38.5 | 114.6 | 0.0 |

The particular propeller diameter is determined by the maximum "helical path" tip Mach number $M_{HT}$ permitted and the number of blades. For the critical case of a single motor in operation, a value of $M_{HT}=0.85$ is preferred, and, in order to limit the size, a four-bladed propeller is selected.

The design point is a "cruise" or "loitering" position at 70,000 feet. A propeller blade angle of 30° is preferred for maximum efficiency, resulting in a flight speed of 85 m/sec. from a total shaft input power of 35 kW. The maximum continuous power required for one motor is seen in the case where the other motor has failed. Thus, it is seen that a larger power input equal to 37.8 kW is required for the single motor case due to an increase in trim drag from thrust asymmetry.

In order to achieve a reasonable time to climb to 70,000 feet, a total shaft power of 51.1 kW is preferred. Of this power, 10 kW is taken from that reserved for the payload, this power not being fully utilized by the propulsion system until the aircraft attains station height. The remaining power required for climb corresponds to an increase of 17.5% above the normal cruise power requirement of 35 kW.

At lower altitudes (up to 3,630 feet), the higher air density causes a slower rotation of the motors. In order to counteract this effect, the propeller blade angle is set at 12.5° in order to maintain sufficient propeller rotational speed. However, even with a reduced blade angle of 12.5°, the rotational blade speed is reduced to 60% of the speed during climb at 70,000 feet. This slower turning of the motors is associated with a 20% drop, or 80% electrical efficiency in comparison to the climb efficiency at the higher altitude. The rotational blade speed increases up to 14,510 feet from decreasing air density, but the propulsive efficiency and corresponding shaft power available are at reduced values in comparison to optimum values. Between 14,510 and 23,690 feet, the propeller blade angle is increased to 15°. At 23,690 feet, the reduced blade speed is associated with a 10% drop, or 90% electrical efficiency in comparison to the climb efficiency at 70,000 feet, leading to a 10% reduction in shaft power.

In the altitude range of 23,690 feet to 43,886 feet, the blade angle maintained at 15° but the rotational blade speed increases the maximum climb value. In the region of 43,886 feet to 70,000 feet, the shaft power will remain constant at 51.1 kW, but the propulsive efficiency is reduced at blade angles lower than 30°.

Finally, the maximum equilibrium level flight speed at 70,000 feet is 114.5 m/sec with a blade angle of 30°, utilizing full climb power of 51.1 kW. This speed corresponds to a lift coefficient of 0.538 which defines the lower limit of $C_L$ range for minimum drag. However, desirably, at cruise at the preferred height of 70,000 feet, the aircraft will be operating at peak efficiency with a blade angle of 30° and an air speed of 84 m/sec while utilizing 35 kW of shaft power.

The time to climb to 70,000 feet is roughly in inverse proportion to the power increase above normal cruise requirements used during the climb. The maximum power above normal cruise that can be used is limited by the propeller tip Mach number considerations. For the present invention, a maximum increase to about 70 kW of shaft power would approximately reduce the time to climb to 70,000 feet from 3.9 hours to 2.0 hours. In general, the climb power requirement will determine the required power level of the received microwave energy flux.

Motor and Landing Gear Mounting

As seen in FIGS. 5 and 6, the nacelles 28 on either side of the inner wing 50 provide a housing for the propulsion mechanism and landing gear system. FIG. 5 shows the relation of the nacelles 28 to both the outer wing 52 and the inner wing 50. The nacelle 28 comprises a torpedo-shaped body 66 terminating in a frusto-conical-shaped spinner 68 integrally connected with the propeller 30. The low profile of the inner wing 50 and nacelles 28 above the ground and in relation to the tail 54 is apparent in FIG. 5, this low profile further reducing the landing gear weight thus increasing the overall flight efficiency.

In order to reduce drag-inducing turbulence in the vicinity of the nacelles 28, a relatively thin boundary layer pylon or flow diverter 69 depends from underneath the wing to space the nacelles from the wing. The diverter 69 is designed to mount objects in a spaced relationship to an aerodynamic body without adding drag to the assembly. In this manner, the aerodynamic flow around the outer wings 52 is relatively undisturbed in a transverse direction at the location of the nacelles 28. Stated another way, the boundary layer of the flow around the nacelles 28 does not interfere with the spanwise lift distribution (or boundary layer flow) of the outer wings 52. The major body portion 66 of the nacelles hangs down below the outer wings 52 and tapers upward at the rear end to terminate in the spinner 68 and propeller 30. The axis of the propeller rotation is approximately aligned with the outer wing 52 chordline in order to reduce the clearance required under the aircraft for the propellers.

Now referring to FIG. 6, a detailed cross section of one of the nacelles 28 is shown. At the forward portion, a series of stepped size lightweight batteries 72 fit within the torpedo-shaped body 66. The batteries 72 supply power for aircraft 26 in order to protect against irregular power spikes in the microwave transmission caused by inclement weather or other reasons. The batteries 72 store excess power collected by the rectenna 58 for emergency use in case of a power shortage from the ground.

Although the connections are not shown, the batteries 72 supply power to a motor 74 having an output shaft 76. The output shaft 76 is coupled to a gear box 78, which reduces the rotational speed of the output shaft and turns a propeller shaft 80. The propeller shaft 80 is keyed to an internal through bore (not shown) of the spinner 68. Although not shown in FIG. 6, the rectenna 58 is connected electrically via power busses to the motor 74 to provide a majority of propulsive power to the aircraft 26. Also, a switching unit (not shown) is provided to connect either the batteries 72 or the rectenna 58 to the motor 74, depending on the situation.

As seen in FIG. 6, the wheels 70 are mounted on struts 82 which are pivoted within the nacelle body 66, to retract or extend the wheels on takeoff and landing. The phantom wheels 84 depict the position of the landing wheels within the body 66 when retracted.

The electric motors preferably have the typical characteristics of DC motors with permanent magnet IE with a linearly decreasing torque at constant voltage and a no-load rotational speed in proportion to the voltage. Maximum shaft power is achieved at half the no-load rpm and maximum electrical efficiency at around 75% of the no-load rpm. The preferred motor is manufactured by Sunstrand Aerospace Corp. of Rockford, Ill.

Wing Chordal Geometry

As shown in FIGS. 7, 8 and 9, a view of one-half of the aircraft 26 of the present invention is shown without the tail 54, the aircraft being symmetric about a center plane 86. The shape of the inner wing 50 at this center plane 86 is depicted in FIG. 9 with a nacelle 28 on the far side seen extending a short distance forward. Spanwise, the aircraft is divided into sections of different chordal geometries, based on the distance from the center plane 86. FIG. 8 shows lines denoting cross sectional planes A–K of the aircraft from the center plane 86 out to the wing tip 88.

As also shown in FIG. 8, the leading edge of the preferred wing 52 includes different swept-back angles for more efficient flight. In particular, a main sweep angle $\alpha$ is preferably 15°. Furthermore, a second sweep angle $\theta$ is approximately equal to 13.2°. The dashed line 90 on the outer portion of the wing represents a 35% chord, or a 0.35 fractional distance from the forward edge 92 to the trailing edge 94 at every point along the wing. This dashed line makes an angle of $\beta$ of approximately 12°, measured from F to K planes, with a line 96 drawn perpendicular to the direction of flight.

TABLE 2

| Wing Section | Distance from Center Plane (cm) | Chordal Length (cm) |
| --- | --- | --- |
| A | 0 | 725 |
| B | 250 | 608 |
| C | 437 | 417 |
| D | 500 | 178 |
| E | 602 | 151 |
| F | 625 | 144 |
| G | 649 | 143 |
| H | 1,000 | 121 |
| I | 1,250 | 88 |
| J | 1,417 | 67 |
| K | 1,542 | — |

TABLE 2-continued

Figure 10A:
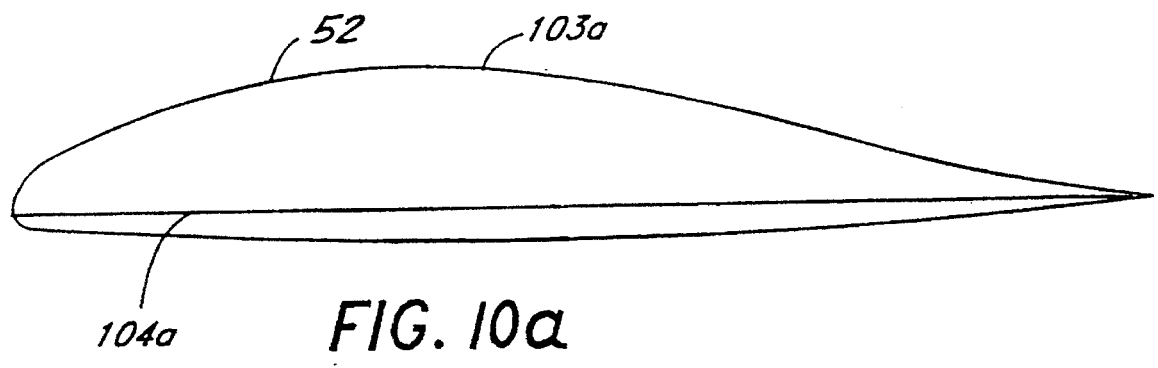
FIGS. 10a–10e are sectional views showing varying airfoil shapes used in the outer wing construction.
Figure 10B:
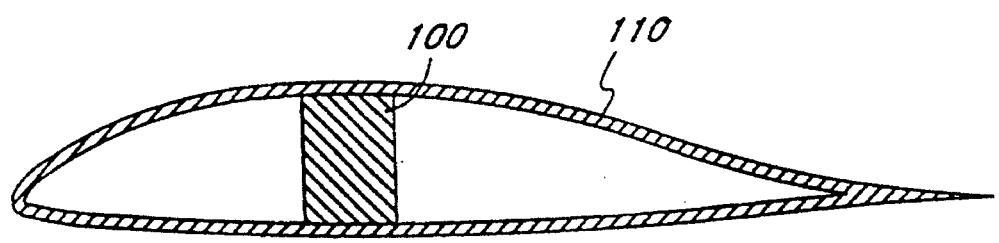
Figure 10C:
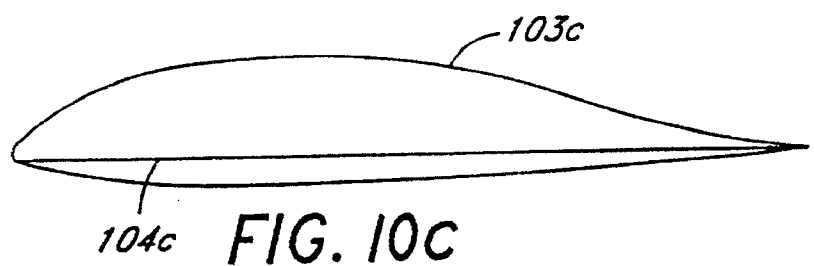
Figure 10D:
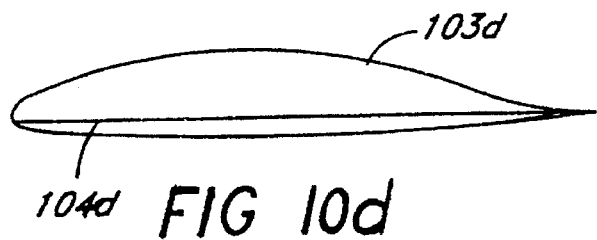
Figure 10E:
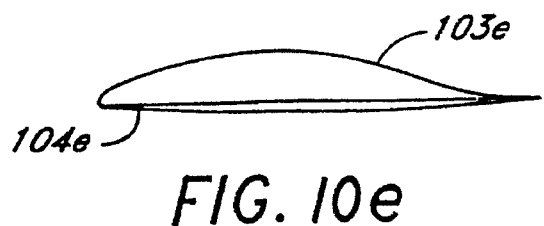

Table 2 gives data for the chord lines at the cross sectional planes A–K shown in FIG. 8. Several of the airfoil outlines 103 and chord lines 104 are shown in FIGS. 10a–10e. Thus, FIG. 10a shows an outline 103a of the wing 52 along plane D with a chordal length 104a of 178 cm. FIG. 10b is a cross-sectional view along plane F of FIG. 8 with a chordal length of 144 cm. FIG. 10c shows an airfoil outline 103c through plane H, that point of the wing having a chordal length 104c of 121 cm. FIG. 10d is at point I of FIG. 8, that outline 103d of the wing having a chordal length 104d of 88 cm. And finally, FIG. 10e shows the outline 103e of the wing 52 at line J of FIG. 8, where the chordal length 104e is approximately 67 cm.

In a divergence from commonly accepted wing construction, the airfoil geometry of the outer wings 52 not only tapers down in the chord direction, but at a greater rate in the thickness dimension. In other words, as a percentage of the chord dimension, the thickness decreases in an outward direction from the center plane 86. Preferably, the thickness is approximately 15% of the chord length within the inner wing 50. At the point of cross sectional plane D, the thickness is approximately 13% of the chord dimension. Preferably, at cross sectional plane E, the thickness is approximately 11% of the chord dimension, this percentage continuing out to the wing tip 88. This novel wing design reduces the introduction of vortices across the wing in order to produce a substantially laminar flow from the center plane 86 all the way out to the wing tips 88.

In an important region of the present aircraft 26, the area between cross-sectional planes C and D and continuing out to the wing cross-sectional plane E (FIG. 8) is a region where the chord lengths undergo a drastic reduction, and thus there is a great potential for generation of vortices. The outer wing 52 is constructed with an angle of attack (or the angle between the cord line and a horizontal flight line) of approximately 3°. Due to the extremely efficient air flow over the outer wing 52, as manifested in the decreasing thickness and also preferred nacelle 28 position, the outer wing 52 comprises an extremely high aspect ratio portion of the aircraft and a majority of lift is generated by flow over the outer wings 52. In contrast, the inner wing 50 represents a relatively low aspect ratio body with a minimum amount of lift and also a minimum amount of drag due to the laminar flow thereover. As a result, the region proximate the intersection between the inner wing 50 and the outer wing 52 represents a severe change in flow regimes.

In order to combat this discontinuity, the region between the cross sectional planes C and D is also at a three-degree angle of attack, while the remaining portion of the inner wing 50 is at a zero-degree angle of attack. Thus, still referring to FIG. 8, as one looks at the cross-sectional shapes from the planes A through E, the chordline reduces dramatically to plane D. At plane C, the angle of attack becomes 3° to match the angle of attack of the outer wing 52. At the cross sectional plane D, the thickness ratio reduces to 13% at the intersection of the inner wing 50 and the outer wing 52. Continuing outward, the outer wing 52 has a thickness ratio of approximately 11% from cross sectional plane E onward.

Of course, these transitions in thickness ratio and angle of attack do not occur instantaneously, but preferably occur gradually. The end result, which has been verified in wind tunnel testing, is a substantially laminar flow across the inner wing and also at the transition between the inner wing and outer wing 52.

As a consequence, the design of the present aircraft 26 is an abrupt departure from conventional aeronautical wisdom. In order to provide sufficient surface area to mount the rectenna 58, the inner wing 52 has an extremely large cross-sectional area in relation to the outer wings 52. One skilled in the art would intuitively reject this format as producing too much turbulence and associated drag, especially at the interface between the wide inner wing and thinner outer wings. The solution to this dilemma, as embodied in the present invention, thus provides a surprising result which, as mentioned above, has been verified in wind tunnel testing. In the wind tunnel testing, a 1/12th scale model of one-half of the aircraft (i.e., from the center plane 86 out to one wing tip) was tested with the flow parameters, such as the Reynolds number, matching those which would occur for the aircraft flying at 70,000 feet.

Wing Construction

The preferred construction of the wing 52 is shown in cross section in FIG. 10b. The central cantilever stiffness of the outer wings 52 is provided by a central spar 100, which is preferably molded from composite material. An outer shell 110 forms the airfoil shape. This minimum yet relatively strong design substantially reduces the weight of the aircraft, allowing a larger percentage of weight to be dedicated to the onboard payload. Although not shown, preferably, the spar 100 extends a short distance into a similarly shaped receptacle on the outward face of the inner wing 50 at cross section D, and a pin or other similar expedient will hold the spar into the receptacle.

The inner wing 50, on the other hand, has a number of cross ribs or braces 102, as shown in FIG. 2. An outer shell 108 provides the outer surface of the inner wing 50 and is preferably constructed in a similar manner as the outer wing 52; that is, a thin sheet of Kevlar or composite material comprising graphite/resin or other components.

Power Distribution in the Aircraft

Figure 11:
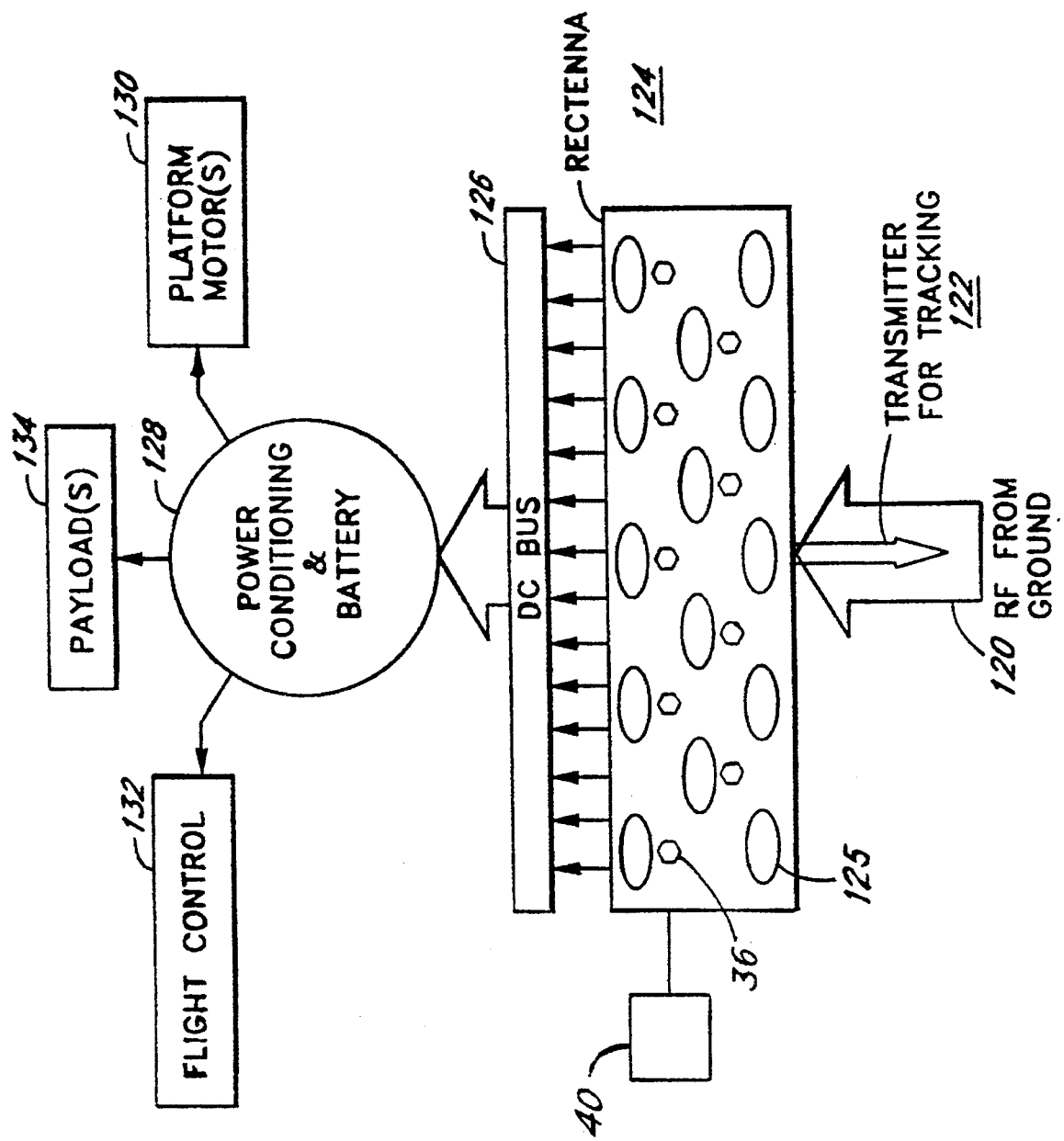
FIG. 11 is a general schematic view of the power rectifying and distribution layout on the unmanned aircraft.

FIG. 11 is a schematic representation of the general power distribution system of the aircraft of the present invention. A large arrow 120 at the lower portion represents a microwave RF signal beamed up to the aircraft 26 from the ground. The smaller arrow 122 pointing downward represents the beacon or transmitter signal used by the ground antenna 22 for tracking the aircraft 26. The microwave signal hits the rectenna 124, comprised of an array of rectifying panels 125 mounted on the underside of the aircraft. The microwave signal is converted to DC power and channeled to at least one DC bus 126. The DC bus 126 provides power to the power conditioning system and backup batteries 128, which in turn store power for release and in case of microwave transmitter failure. Power is then distributed through the aircraft to the propulsion or platform motors 130, the flight controls 132 and the payload 134.

Figure 12:
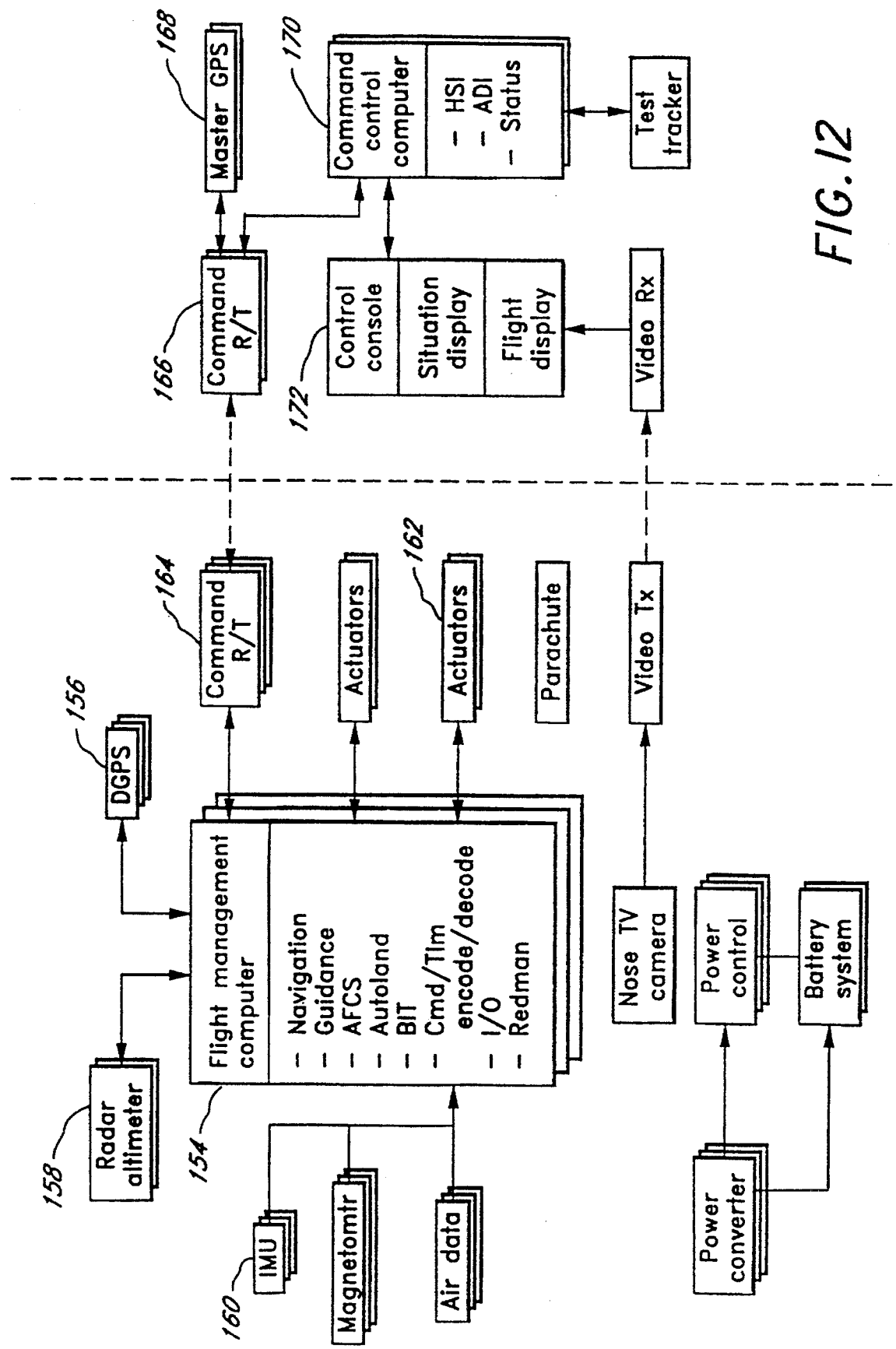
FIG. 12 is a schematic view of a preferred flight management system for the unmanned aircraft.

Referring now to FIG. 12, a more detailed power management and distribution system of the present invention is shown. After being towed to a height of approximately 15,000 feet and released, all the aircraft power is supplied by the rectenna 58. Due to a high cruise altitude of around 70,000 feet, severe corona effects are present, and thus a maximum DC bus voltage of 270 V is preferred. This voltage may still be too high for the level of corona effects at the preferred altitude. In one embodiment, the primary electrical loads on board the aircraft are shown as follows in Table 3.

TABLE 3

| Load | Power (kW) | Current (amps at 270 volts DC) |
|---|---|---|
| flight controls | 4 | 15 |
| payload | 10 | 37 |
| propulsion | 90 | 333 |
| TOTAL | 104 | 385 |

It is preferred that the flight control system will be designed around a triplex philosophy, as shown in FIG. 12. The power management and distribution system or PMAD preferably comprises three identical units 136a, 136b, 136c. Each unit will perform the following: monitor input voltage and current; monitor output voltage and current; monitor load currents; and provide load isolation. Isolation of loads will be achieved using 270 VDC contactors controlled from the PMAD units. The three DC buses 138a, 138b, 138c are preferably capable of providing the following amounts of load:

PMAD A: 52 kW→200 amps @ 270 VDC

PMAD B: 52 kW→200 amps @ 270 VDC

PMAD C: 14 kW→50 amps @ 270 VDC

From the physics of power beaming, there is a significant attenuation of the microwave beam strength from the center of the beam 24 to the outer edges, estimated to be about 3 dB. In other words, the beam strength at the edge of the rectenna 58 is approximately 31% of the beam strength at the center. This is understood to be directly manifested by the output voltage of the independent radiated rectifying panels, leading to a panel output voltage range of about 3:1.

Advantageously, the size of the rectenna 58 is optimized to collect the maximum amount of beamed energy from the ground antenna 22. Specifically, the power beam 24 includes a main lobe which has a maximum strength density diameter of approximately 8 meters at the aircraft. As described supra, the altitude of the main lobe may be adjusted by adjusting the position of the subreflector 32 of the antenna 22. Thus, the main lobe can be focused on the aircraft rectenna 58 at a variety of altitudes, from 15,000 feet up to 70,000 feet. Due to the fact that the rectenna 58 has a preferred diameter of 10 meters, there is a certain amount of leeway for tracking error when the main lobe is being focused on the rectenna. Preferably, this leeway is approximately one foot from the edge of the diameter of the main beam strength to the edge of the rectenna 58. Again, although FIG. 4 shows the entire inner wing 50 having rectifying panels mounted thereon, because the cross-sectional distribution of the power beam 24 is generally circular the rectenna 58 is preferably of a slightly larger matching shape such as the dashed line 59.

The rectenna interconnect is arranged so as to appropriately parallel and series connect the rectifying panels 125 in order to derive a reasonably constant voltage source at or near to 270 VDC. It will be recognized, however, that the load curve presented by the present distribution system may be less than ideal for various rectenna designs, and that consequently a different output voltage may be desirable. For example, 52 kW at 200 amps represents a DC load of 1.3 ohms ($\Omega$). Should this be the case, then the PMAD units would be required to incorporate DC/DC power conversion technology. However, this represents a significant size and cost penalty.

Flight Management System

An improved flight management system shown in FIG. 13 is incorporated into the unmanned aircraft of the present invention. The flight management system makes use of various sensor inputs into a central flight management computer 154. The computer 154 may be one supplied by Teledyne Ryan Aeronautical. Protecting the computer from the high-energy microwave field (HEF) is critical to proper operation of the electronics equipment. The software utilized in the computer 154 is similar to that used in model 410 computers manufactured by Teledyne. The software is modified based on the present aircraft characteristics and in order to accommodate I/O changes. The software includes an additional guidance capability to allow a remote operator to manually fly the aircraft 26 while under tow, for example. Preferably, a nose-mounted TV camera would provide a forward view to see the tow aircraft for guidance cues. A differential global positioning system (DGPS) 156 and a radar altimeter 158 provide precision approach information needed for autoland capabilities.

Conventional flight data sensors are replaced by a strapdown inertial measurement unit (IMU) 160. Computer software converts the IMU measurements into the attitude, heading, rate and acceleration information needed by the automatic control system and for dead reckoning navigation. The IMU reliability is an order of magnitude higher than conventional flight data sensors and is comparable in cost. Reliability and redundancy are extremely important factors in the preferred flight management system of the present invention.

As shown in FIG. 13, the levels of redundancy (indicated by layered boxes) for the various elements are necessary due to the long duration flight of up to several months of the aircraft 26 of the present invention. In fact, the flight management system has a reliable life, or Mean Time To Failure (MTTF), of approximately 3–6 months based on the MTTF of each individual component and the number of backups provided. The redundant elements provide in-flight spares and allow comparisons for fault detection and isolation. The fault indication is tested to determine whether there is a valid fault detected or simply a false alarm. In a further desirable addition to the aircraft of the present invention, heaters may be needed for a number of actuators 162 to prevent them from freezing at altitude.

Desirably, modifications to conventional systems are required to incorporate radiation hardening. Naturally occurring causes transient circuit upsets, which can effect system operation. The probability of an upsetting event increases with altitude and exposure time. The selection of hardened components enables the flight management system to handle soft air transients and minimize the number of upsetting events. In one embodiment, the flight control components are shielded from microwave radiation with the use of a special metal enclosure. Such an enclosure may be a solid thin aluminum or some type of mesh enclosure designed to interrupt microwave energy.

A command realtime interface 164 communicates with a similar interface 166 in the ground control system. A master global positioning system 168 is utilized on the ground to coordinate with the airborne digital global positioning system 156. A command control computer 170 processes information and displays it on various monitors, such as is enclosed in the box 172. The entire ground control system may be housed in a suitable building or in a mobile facility.

In what is considered a departure from existing unmanned aircraft navigation systems, the present aircraft preferably incorporates a plurality of solid-state sensors located along the inner and outer wings 50, 52 which sense the position and velocity of the points on the aircraft relative to the ground. As depicted schematically in FIG. 4, a number of such sensors 42 are shown distributed across the underside of the aircraft 26 at predetermined intervals. Although a number of sensors 42 are shown, there may be as few as one, but more preferably there are between 5 and 15 sensors. The sensors 42 may be, for example, any electromagnetic transducer capable of range finding and Doppler frequency shift determination of velocity; however, the capacity to judge velocity is not a critical function. Preferably, however, the sensors 42 are small lasers requiring between 1 and 2 Volts embedded in the skin of the aircraft to reduce added wind resistance. The lasers are coupled to an optical receiver to comprise the sensor 42 capable of at least judging distances. As the aircraft 26 approaches a runway, the radar altimeter 158 loses effectiveness and the sensors 42 become useful. Within at least 50 feet altitude from the landing surface, the sensors 42 begin range finding of the precise height at each sensor location. The altitude and attitude of the plane 26 are thus continuously monitored and adjustments made to correct the landing posture. This detailed information greatly facilitates the auto-land operation and virtually eliminates the risk to the costly payload and plane of a hard landing or crash.

The ground control center 20 may include various microwave beam generating systems in addition to a precisely movable pedestal for the antenna. The microwave signal generator system comprises a number of discrete components which may be obtained from various vendors and are not shown herein. The system may include a pair of 200 kW gyrotrons 180, such as model VGA-8003 gyrotron tubes supplied by Varian Associates of Palo Alto, Calif. The microwave signal beam is preferably at a frequency of 35 GHz.

Although this invention has been described in terms of certain preferred embodiments, other embodiments that are apparent to those of ordinary skill in the art are also within the scope of this invention. Accordingly, the scope of the invention is intended to be defined only by the claims.

I claim:

1. An unmanned, remotely-controlled, high-altitude, light-weight aircraft powered by electromagnetic energy while aloft, said aircraft comprising:

a central broad inner wing having a low aspect ratio and a low thickness ratio, and a pair of outer wings positioned on opposite sides of said inner wing and having a high aspect ratio, said inner wing having a blunt and slightly V-shaped leading edge having opposite end portions which are co-linear with leading edges of the outer wings, respectively;

a smooth wing transition section provided between said inner wing and each of said outer wings, for enabling a laminar flow thereacross, said transition section having an attack angle substantially matching an attack angle of said outer wings;

an electromagnetic energy receiving device positioned on an underside of said broad inner wing for receiving electromagnetic energy transmitted by a terrestrial system to said aircraft;

a conversion system for converting the received electromagnetic energy into electricity;

an electrical propulsion system for powering said aircraft while aloft; and means for transmitting the electricity from said conversion system to said propulsion system.

2. The aircraft of claim 1, wherein said outer wings have gradually reducing thickness ratio.

3. The aircraft of claim 1, wherein said inner wing and said outer wings have substantially similar airfoil cross-sectional shapes.

4. The aircraft of claim 3, wherein said outer wings are formed by hollow shells, and said inner wing is formed by an outer shell reinforced with intermittent longitudinal and transverse spars.

5. The aircraft of claim 1, wherein said inner and outer wings have an overall aspect ratio of 36.

6. The aircraft of claim 1, wherein the aircraft has a glide ratio in a range 20–60.

7. The aircraft of claim 5, wherein the glide ratio is 40.

8. The aircraft of claim 1, wherein said inner wing has a substantially horizontal attack angle, and said outer wings have an attack angle of approximately 3°.

9. The aircraft of claim 1, wherein said propulsion system comprises electric motors mounted on pylons extending from said outer wings.

10. The aircraft of claim 1, wherein said electromagnetic receiving device comprises a rectenna.

* * * * *